United States Patent [19]
Primdahl

[11] Patent Number: 6,123,873
[45] Date of Patent: *Sep. 26, 2000

[54] METHOD FOR SOOT-FREE START-UP OF AUTOTHERMAL REFORMERS

[75] Inventor: Ivar Ivarsen Primdahl, Copenhagen, Denmark

[73] Assignee: Haldor Topsoe A/S, Lyngby, Denmark

[*] Notice: This patent issued on a continued prosecution application filed under 37 CFR 1.53(d), and is subject to the twenty year patent term provisions of 35 U.S.C. 154(a)(2).

[21] Appl. No.: 09/248,897

[22] Filed: Feb. 12, 1999

Related U.S. Application Data

[60] Provisional application No. 60/074,689, Feb. 13, 1998.

[51] Int. Cl.⁷ .................. C06D 1/62; C07C 1/02; C01B 3/02
[52] U.S. Cl. ............... 252/376; 252/373; 423/648.1
[58] Field of Search .................. 252/373, 376; 423/648.1

[56] References Cited

U.S. PATENT DOCUMENTS

| | | | |
|---|---|---|---|
| 4,946,667 | 8/1990 | Beshty | 423/648.1 |
| 5,122,299 | 6/1992 | Le Blanc | 252/376 |
| 5,628,931 | 5/1997 | Lednor et al. | 252/373 |

*Primary Examiner*—Johann Richter
*Assistant Examiner*—J. Parsa
*Attorney, Agent, or Firm*—Ostrolenk, Faber, Gerb & Soffen, LLP

[57] ABSTRACT

Method for initiating operation of an autothermal reformer including the steps of preparing a hot gas which is rich in hydrogen by contacting a methanol and steam containing feed gas with a methanation catalyst and introducing the hot gas into the autothermal reformer, thereby heating the reformer with heat contained in the hot gas to a temperature which is sufficiently high to initiate and maintain subsequent reforming reactions to be carried out in the reformer.

1 Claim, 1 Drawing Sheet

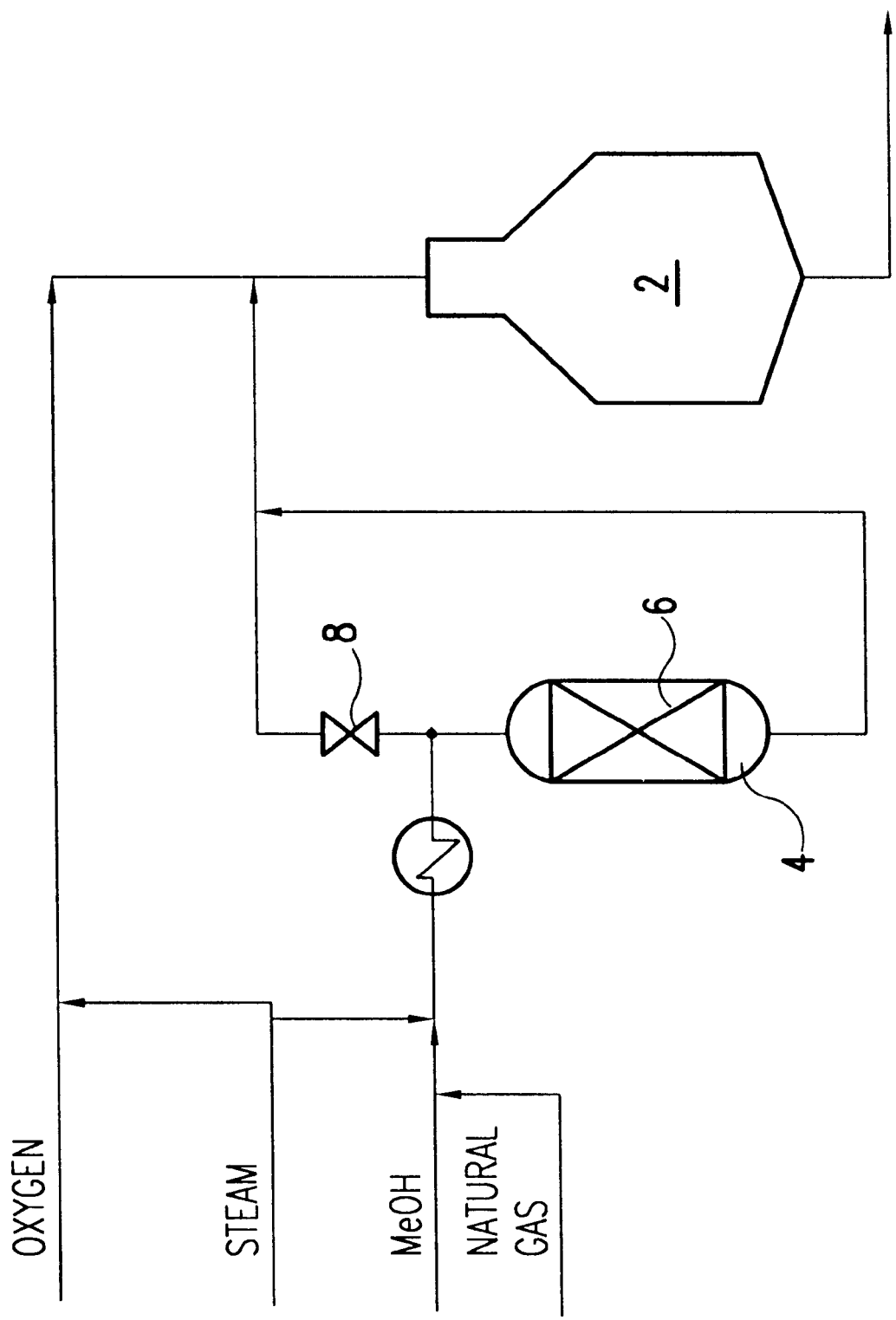

METHOD FOR SOOT-FREE START-UP OF AUTOTHERMAL REFORMERS

This application claims the benefit of U.S. provisional application Ser. No 60/074,689, filed Feb. 13, 1998.

BACKGROUND OF THE INVENTION

Conventionally, autothermal reformers are stand alone reformers with no tubular reformers up-stream. Start-up of the autothermal reformers has been performed by preheating the entire reactor to high start-up temperatures i.e. between about 600° C. and 1000° C. After the start-up temperature has been reached, a feedstock of e.g. gas steam mixtures and oxygen steam mixtures or in some cases oxygen air-mixtures is introduced into the heated reactor for further processing. The reactor is thereby subjected to detrimental pressurization and refractory lining material in the top part of the reactor and to excessive heat-up, during the first period of operation until a constant high pressure has been established.

During start-up, autothermal reformers produce a product gas mixture containing soot particles leading to a dark condensate, which cannot or only after further processing be reused. Other methods of starting similar reactors have been used in the industry.

In the ammonia industry, where a tubular reformer supplies heat for preheating of a secondary reformer when added to the secondary reformer so that the secondary reformer is not subjected to abrupt pressure changes and only to a modest increase in temperature.

SUMMARY OF THE INVENTION

It has now been found that the start-up of an autothermal reformer may be performed by two different methods.

In one method of the invention, a gas is produced as feed to the autothermal reactor, which is similar to the gas supplied from a tubular reformer. This method can be used in a plant with a fired heater followed by an adiabatic pre-reformer and optionally a reheat step before the autothermal reformer.

In another method of the invention, a mixture of methanol and steam is preheated in a fired heater and then passed to a methanation reactor in which methanol is decomposed to form hydrogen and carbon oxides and minor amounts of methane. By changing the ratio between steam and methanol, the outlet temperature from the methanator is adjusted to temperatures similar to the inlet temperature to the methanator in order to heat the autothermal reformer and at the same time activate the catalyst contained therein. The mixture leaving the methanator is rich in hydrogen and optionally rich in steam. The gas mixture is then similar to the gas leaving a tubular reformer at temperatures about 650° C. or higher, when the tubular reformer is operated with a steam to carbon ratio of between 2.5 and 4.5. The hot mixture is then introduced into the autothermal reformer to warm up the reformer and to start the reforming reaction. One example of the invention is the following detailed description of the preferred embodiment of the invention.

Other features and advantages of the present invention will be come apparent from the following description of the invention which refers to the accompanying drawings.

BRIEF DESCRIPTION OF THE DRAWING

The drawing illustrates a schematic flow sheet of the start-up method according to the preferred embodiment of the present invention.

DETAILED DESCRIPTION OF THE PREFERRED EMBODIMENT

Referring to the drawing, an autothermal reformer 2 is designed for a natural gas flow of approximately 200.000 Nm$^3$/h. For the start-up of such a reformer, a methanator 4 with 2–4 m$^3$ of catalyst 6 will be adequate and an hourly flow of methanol during the start-up phase of 15 to 20 ton/h is sufficient. In the example, a 50-50 mixture of methanol (MeOH) and steam is used and the mixture is preheated to 550–650° C. The methanator will then have an outlet temperature of about 675° C.

The total estimated methanol consumption for one start-up cycle is about 100 metric ton. The methanator is equipped with a pressure drop controlled by-pass valve. After ignition, natural gas is added gradually to the combined stream. As the pressure drop in the methanator increases, the by-pass valve 8 disposed as a by-pass over the start-up reactor is opened and the plant gradually changes to normal running conditions.

Following completion of the ignition by means of the supply of steam and the synthesis gas from (4), the temperature in (2) will have increased sufficiently to allow the steam reforming to be based on natural gas lead through (8).

A further advantage according to the present invention is that materials used for the construction of (2) may be more inexpensive compared to what has been described in the prior art. The reason for this is that there will be no sudden increases of neither pressure nor temperature in the size of order as described for known procedures in the above section "Background of the Invention". On the contrary, both temperature and pressure will rise gradually effectuated by a stepwise addition of synthesis gas to (2).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of initiating operation of an autothermal reformer comprising the steps of:

(a) preparing a hot gas rich in hydrogen by contacting a methanol and steam containing feed gas with a methanation catalyst, said hot gas being at a temperature sufficient to initiate and maintain a reforming reaction; and (b) introducing the hot gas into the autothermal reformer, thereby heating the reformer with heat contained in the hot gas to a temperature which is sufficiently high to initiate and maintain subsequent reforming reactions to be carried out in the reformer.

* * * * *